US011626715B2

(12) United States Patent
Carroccia et al.

(10) Patent No.: US 11,626,715 B2
(45) Date of Patent: Apr. 11, 2023

(54) CORD PROTECTOR

(71) Applicant: On Top Safety Equipment, LLC, Cheektowaga, NY (US)

(72) Inventors: John J. Carroccia, Orchard Park, NY (US); Jeffrey L. Murray, Hamburg, NY (US)

(73) Assignee: On Top Safety Equipment, LLC, Cheektowaga, NY (US)

( * ) Notice: Subject to any disclaimer, the term of this patent is extended or adjusted under 35 U.S.C. 154(b) by 0 days.

(21) Appl. No.: 17/445,895

(22) Filed: Aug. 25, 2021

(65) Prior Publication Data

US 2023/0067186 A1   Mar. 2, 2023

(51) Int. Cl.
*H02G 3/04* (2006.01)

(52) U.S. Cl.
CPC ......... *H02G 3/0487* (2013.01); *H02G 3/0406* (2013.01)

(58) Field of Classification Search
CPC ...... H02G 3/0487; H02G 3/263; H02G 11/00; H02G 3/04; H02G 3/22; H02G 1/1256; H02G 15/184; H02G 3/10; H02G 3/26; H02G 3/38; H02G 1/02; H02G 1/12; F16L 3/233; E05D 11/0081; H01B 7/0045
USPC ...................................................... 174/68.3
See application file for complete search history.

(56) References Cited

U.S. PATENT DOCUMENTS

| | | | | |
|---|---|---|---|---|
| 817,557 A | * | 4/1906 | Hatherly et al. | F16G 11/00 24/129 R |
| 1,668,953 A | * | 5/1928 | Erickson | H02G 3/0487 174/101 |
| 2,831,049 A | * | 4/1958 | Cabral | H01B 7/0815 427/119 |
| 2,960,561 A | * | 11/1960 | Plummer | A44B 19/16 24/399 |
| 2,963,676 A | | 12/1960 | Sneesby | |
| 3,003,794 A | * | 10/1961 | Burley | H02G 3/0608 174/101 |
| 3,082,984 A | * | 3/1963 | Larsson | F16L 3/13 174/72 A |
| 3,180,923 A | * | 4/1965 | Gow | H02G 3/0487 174/DIG. 11 |
| 3,183,302 A | | 5/1965 | Wochner | |
| 3,391,244 A | * | 7/1968 | Moll | H02G 7/16 174/40 R |

(Continued)

*Primary Examiner* — Krystal Robinson
(74) *Attorney, Agent, or Firm* — Simpson & Simpson, PLLC

(57) ABSTRACT

A cord protector detachably securable to an object includes a main body having at least one channel disposed therein that extends along a portion of a longitudinal length of the main body and the channel is capable of receiving and securing a cord, line, or tube therein. The cord protector further includes a clamping/gripping mechanism formed of a pair of oppositely disposed clamping/gripping arms that extend from opposite sides of the main body, which are biased toward one another such that the clamping/gripping arms maintain a substantially closed position at rest. The cord protector is capable of being detachably secured to the object by opening the clamping/gripping arms against the bias and allowing the clamping/gripping arms to return toward the resting position such that they close and clamp upon the object.

16 Claims, 9 Drawing Sheets

(56) References Cited

U.S. PATENT DOCUMENTS

| | | | | |
|---|---|---|---|---|
| 3,404,268 | A * | 10/1968 | Fowler | F21V 21/088 362/418 |
| 3,501,117 | A * | 3/1970 | Soltysik | F16L 3/221 24/339 |
| 3,809,799 | A * | 5/1974 | Taylor | H02G 3/263 174/72 A |
| 3,848,361 | A * | 11/1974 | Foster | F16L 3/01 439/31 |
| 4,169,571 | A * | 10/1979 | Duggan | F16L 3/00 248/439 |
| 4,404,425 | A * | 9/1983 | Rich | H01B 7/0823 174/117 A |
| 4,406,434 | A * | 9/1983 | Schneckloth | F16L 3/26 248/83 |
| 4,445,299 | A * | 5/1984 | Lehikoinen | H01R 35/02 439/31 |
| 4,643,505 | A | 2/1987 | House | |
| 4,719,316 | A * | 1/1988 | Hoffman | F16G 11/06 174/91 |
| 4,749,363 | A | 6/1988 | Luska | |
| 4,870,722 | A * | 10/1989 | Shell, Jr. | H02G 3/26 248/69 |
| 4,907,767 | A * | 3/1990 | Corsi | H02G 3/0437 174/101 |
| 5,046,464 | A * | 9/1991 | Hisatomi | F02P 7/021 123/169 PA |
| 5,067,679 | A * | 11/1991 | Courtney | F16L 3/26 248/75 |
| 5,108,055 | A * | 4/1992 | Kreinberg | F16L 3/13 24/703.1 |
| 5,166,478 | A * | 11/1992 | Sprouse | H02G 15/04 439/135 |
| 5,215,280 | A * | 6/1993 | Tigrett | H02G 9/065 D8/356 |
| 5,267,367 | A | 12/1993 | Wegmann, Jr. | |
| 5,280,866 | A * | 1/1994 | Ueki | H02G 3/32 248/74.2 |
| 5,399,812 | A * | 3/1995 | Woszczyna | B60R 16/0215 174/99 R |
| 5,399,814 | A * | 3/1995 | Staber | H02G 3/0456 174/136 |
| 5,463,189 | A * | 10/1995 | Deneke | H02G 3/26 24/336 |
| 5,626,316 | A * | 5/1997 | Smigel | H02G 3/32 248/68.1 |
| 5,739,470 | A * | 4/1998 | Takeda | H02G 3/0487 174/101 |
| 5,905,231 | A * | 5/1999 | Houte | H02G 3/0481 174/95 |
| 6,087,593 | A * | 7/2000 | Skipworth | H02G 11/00 174/136 |
| 6,268,566 | B1 * | 7/2001 | Takiguchi | B60R 16/0215 174/72 A |
| 6,274,813 | B1 * | 8/2001 | Houte | H02G 15/1813 428/36.5 |
| 6,350,135 | B1 | 2/2002 | Acklin | |
| 6,392,147 | B1 * | 5/2002 | Hier | B60R 16/0215 174/72 A |
| 6,464,178 | B1 * | 10/2002 | Kidd, III | F16L 3/1218 248/51 |
| 7,189,100 | B1 * | 3/2007 | Colbourne | H01R 13/6392 439/367 |
| 7,595,450 | B2 | 9/2009 | Lubanski | |
| 8,001,643 | B1 | 8/2011 | James | |
| 8,353,719 | B2 | 1/2013 | Watts | |
| 8,613,411 | B1 * | 12/2013 | Mohns | F16L 3/1226 248/68.1 |
| D776,623 | S | 1/2017 | Jenkins | |
| 9,701,263 | B2 * | 7/2017 | Hagi | B60R 16/0215 |
| 9,887,529 | B2 | 2/2018 | Dew | |
| 2002/0000499 | A1 * | 1/2002 | Aoki | B60R 16/0215 248/51 |
| 2003/0159846 | A1 * | 8/2003 | Takahashi | H02G 3/0608 174/68.3 |
| 2004/0097120 | A1 | 5/2004 | Limber | |
| 2007/0209822 | A1 | 9/2007 | Kaady | |
| 2008/0134477 | A1 * | 6/2008 | Hart | H02G 3/263 24/457 |
| 2013/0146324 | A1 | 6/2013 | Byrne | |
| 2014/0190735 | A1 | 7/2014 | Nixon-Lane | |
| 2016/0013590 | A1 | 1/2016 | Williams | |
| 2016/0268728 | A1 | 9/2016 | Zantout | |
| 2016/0336681 | A1 | 11/2016 | Tutela | |
| 2017/0264090 | A1 * | 9/2017 | Shah | H02G 3/0481 |
| 2020/0312847 | A1 | 10/2020 | Stahlman | |
| 2021/0012931 | A1 | 1/2021 | Enomoto | |

\* cited by examiner

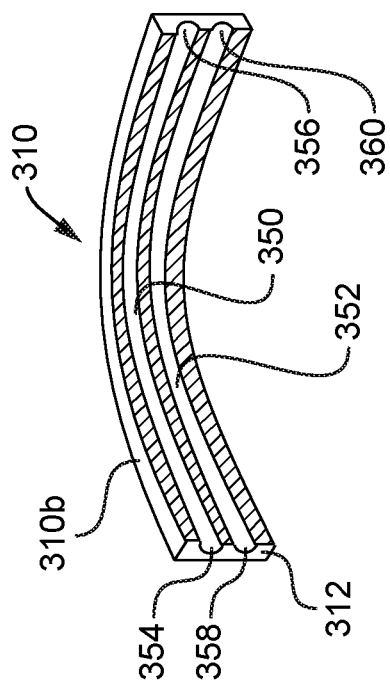
FIGURE 8B
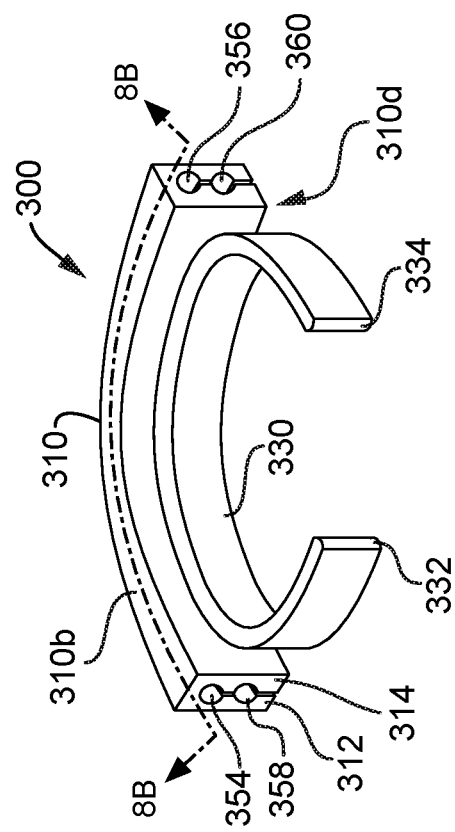
FIGURE 8A
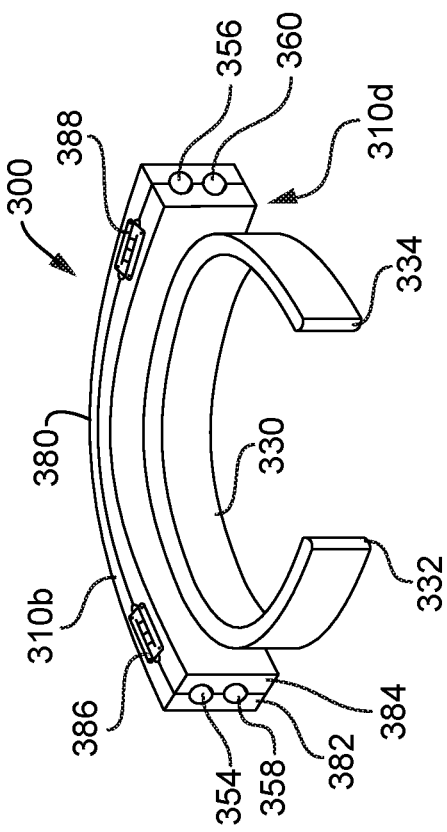
FIGURE 9
FIGURE 10

CORD PROTECTOR

FIELD

The instant disclosure generally relates to a cord, hose, and/or tube protector including a main body having a channel for receiving the cord, hose, and/or tube therein, as well as one or more clamping/gripping members that allow the main body to be detachably secured to an object, such as a door or window frame, thereby allowing the cord, hose, or tube disposed within the channel to be protected from damage that may result from an object such as a door or window that may be closed thereupon.

BACKGROUND

The use of cord protective devices is known. U.S. Pat. No. 7,189,100 describes a cord protector including a housing having an access door for opening and closing the housing to secure and pass a cord therethrough. Similarly, U.S. Pat. No. 4,643,505 describes a cord protector having a housing including an access door, having a shape adapted for holding a pair of mated plugs, and securing members for holding the cords. Another type of cord protector is described in U.S. Pat. No. 3,183,302, which describes a device having a cylindrical housing including an access door and securing members for holding a plug therein. Another cord protector including an access door is described in U.S. Pat. No. 4,749,363 and describes a device that is configured for holding an extension plug having three positions thereon for receiving three male plugs.

While the above-described devices are suitable for their intended purposes, for example, preventing exposure of a male/female electrical cord connection from elements such as water, in the case of building construction site wherein many different tradesmen may be present along with their associated equipment, the likelihood of damage to electrical cords is significant, particularly when electrical cords may be placed on the ground where they can be exposed to foot traffic, liquids, and/or heavy equipment that can cause damage to the electrical cords. In addition to the damage that may occur when an electrical cord is placed on the ground at a construction site, the placement of electrical cords on the ground can also present a tripping hazard to personnel in the workplace. Hence, it is often desirable to secure such types of electrical cords at a height. In addition to the above, there are various federal, e.g., OSHA, state and local safety regulations that must be complied with, which often require that workers be shielded from the accidental exposure to electrical wires, connectors, and components in the workplace, that electrical cords be placed so as to avoid being damaged, placed so as to avoid being exposed to conductive materials, e.g., water and construction fluids, and/or placed or hung without the use of staples, nails or wires that may damage their insulative sheaths. Additionally, when an electrical cord must be passed from one room to another room, it typically must pass through an opening such as a door or window. Hence, damage to an electrical cord can occur when a door or window is shut and pinched between the door/door frame or window/window frame. Additionally, when electrical cords are passed through openings such as doors and windows so to avoid presenting tripping hazards, they are often secured using assemblies such as hooks that are secured to ceilings, walls and door or window frames using nails or screws that cause damage to the ceilings, walls, or door and window frames.

What is needed then, is a readily detachable cord protector that allows an electrical cord, a hose, or a tube to be safely passed through a door or window frame at a height, which cord protector does not cause damage to ceilings, walls or door or window frames, and which reduces the likelihood that the electrical cord, hose, or tube passed therethrough will be exposed to damage.

SUMMARY

At the outset it should be understood that while the following disclosure, figures, and/or claims, etc. describe subject matter including one or more aspects described as either alone or in combination with one or more other aspects, the subject matter of the instant disclosure is not intended to be so limited. That is, the instant disclosure, figures, and claims are intended to encompass the various aspects described herein, either alone or in one or more combinations with one another. For example, while the instant disclosure may describe and illustrate a first aspect, a second aspect, and a third aspect in a manner such that the first aspect is only specifically described and illustrated relative to the second aspect, or the second aspect is only described and illustrated relative to the third aspect, the instant disclosure and illustrations are not intended to be so limiting and may encompass the first aspect alone, the second aspect alone, the third aspect alone, or one or more combinations of the first, second, and/or third aspects, e.g., the first aspect and the second aspect, the first aspect and the third aspect, the second and third aspect, or the first, second and third aspects.

The instant disclosure is generally directed to a cord protector that is detachably securable to an object. The cord protector generally includes a main body having at least one channel disposed therein that extends along a portion of a longitudinal length of the main body, which at least one channel is capable of receiving and securing a cord, hose, or tube therein. The cord protector further includes a clamping/gripping mechanism formed of a pair of oppositely disposed clamping/gripping arms that extend from opposite sides of the main body, which are inherently biased toward one another such that the clamping/gripping arms maintain a substantially closed position at rest. The cord protector is capable of being detachably secured to the object by opening the clamping/gripping arms against the inherent bias and allowing the clamping/gripping arms to return toward the resting position such that they may close and clamp upon the object.

In some aspects, the clamping/gripping arms are elastically deformable such that they are capable of being opened relative to one another against their inherent bias to maintain an active state, and closed relative to one another to return toward their original resting position.

In some aspects, at least one of the clamping/gripping arms include a portion thereof that is plastically deformable such that the portion may be bent or formed and repositioned.

In some aspects, the main body comprises a resilient composition formed of, for example, rubber or like material.

In some aspects, at least one of the clamping/gripping arms include an outer sheath portion and an inner core portion. In some aspects, the outer sheath comprises a resilient composition formed of, for example, rubber or like material, and the inner core portion includes an elastically deformable portion and a plastically deformable portion, the elastically deformable portion being disposed proximate a central region of the clamping/gripping mechanism and the plastically deformable portion being disposed proximate the terminal end regions of each of the clamping/gripping arms. In some aspects, the inner core portion comprises a metal that may be bent or formed and reformed.

In some aspects, the at least one channel extends along the longitudinal length of the main body. In some aspects, the main body includes an outer separated region, an inner separated region, and a bridge portion, the outer separated region and the inner separated region are connected to one another via the bridge portion and are separated from one another by a groove portion in connection with the at least one channel. In some aspects, the bridge portion serves as a hinge allowing the outer separated region and the inner separated region to be separated and opened relative to one another thereby allowing access to the at least one channel and then closed upon one another. In some aspects, the outer separated region and the inner separated region are inherently biased and or may be biased toward one another to maintain a closed position.

In some aspects, the main body includes a plurality of channels extending along a portion of a longitudinal length of the main body and each of the plurality of channels is capable of receiving and securing a cord, line, or tube therein.

In some aspects, the main body includes a cord, line or tube that is integral with the main body and includes a first terminal end having a female connector end and a second terminal end having a male connector.

In some aspects, the main body comprises an outer separated region, an inner separated region, and a hinge, and the hinge connects the outer separated region and the inner separated region to one another such that the outer separated region and the inner separated region are openable and closeable relative to one another.

These and other aspects, features, and advantages of the present disclosure will be readily appreciable from the following description in view the accompanying drawings and claims.

BRIEF DESCRIPTION OF THE DRAWINGS

The nature and mode of operation of an invention in accordance with the instant disclosure will now be more fully described in the following detailed description of the invention taken with the accompanying drawing figures, in which:

FIG. 8A is a rear perspective view of a cord protector according to the instant disclosure including a plurality of channels;

FIG. 8B is a rear perspective sectional view the main body of a cord protector according to the instant disclosure including a plurality of channels taken generally along line 8B-8B of FIG. 8A;

FIG. 9 is a rear perspective view of a cord protector according to the instant disclosure including a plurality of channels, as well as a hinge mechanism;

FIG. 10 is a rear perspective view of a cord protector according to the instant disclosure including an integral cord and associated connectors, e.g., male and female connectors;

DETAILED DESCRIPTION

Figure 1:
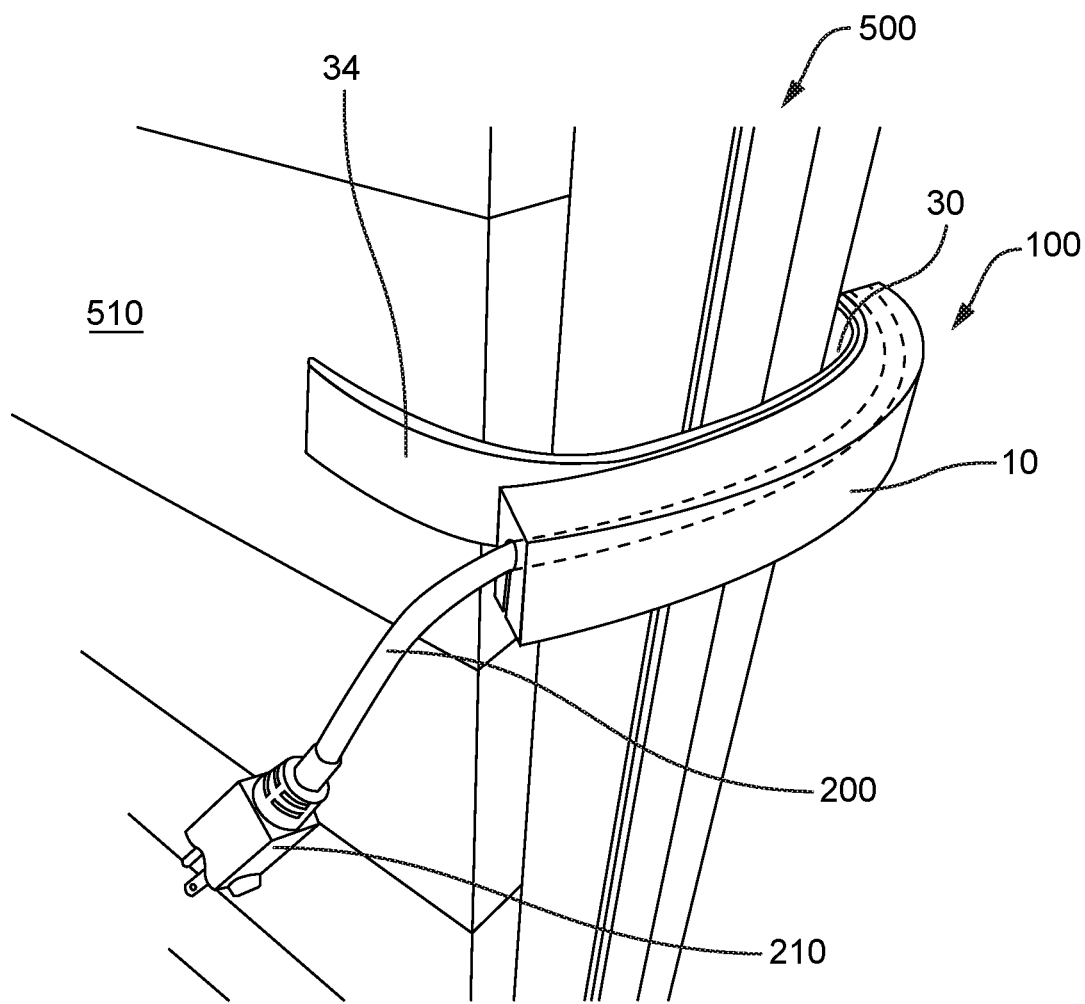
FIG. 1 is a leftward-side perspective view of a cord protector according to the instant disclosure detachably secured attached to a doorframe.
Figure 2:
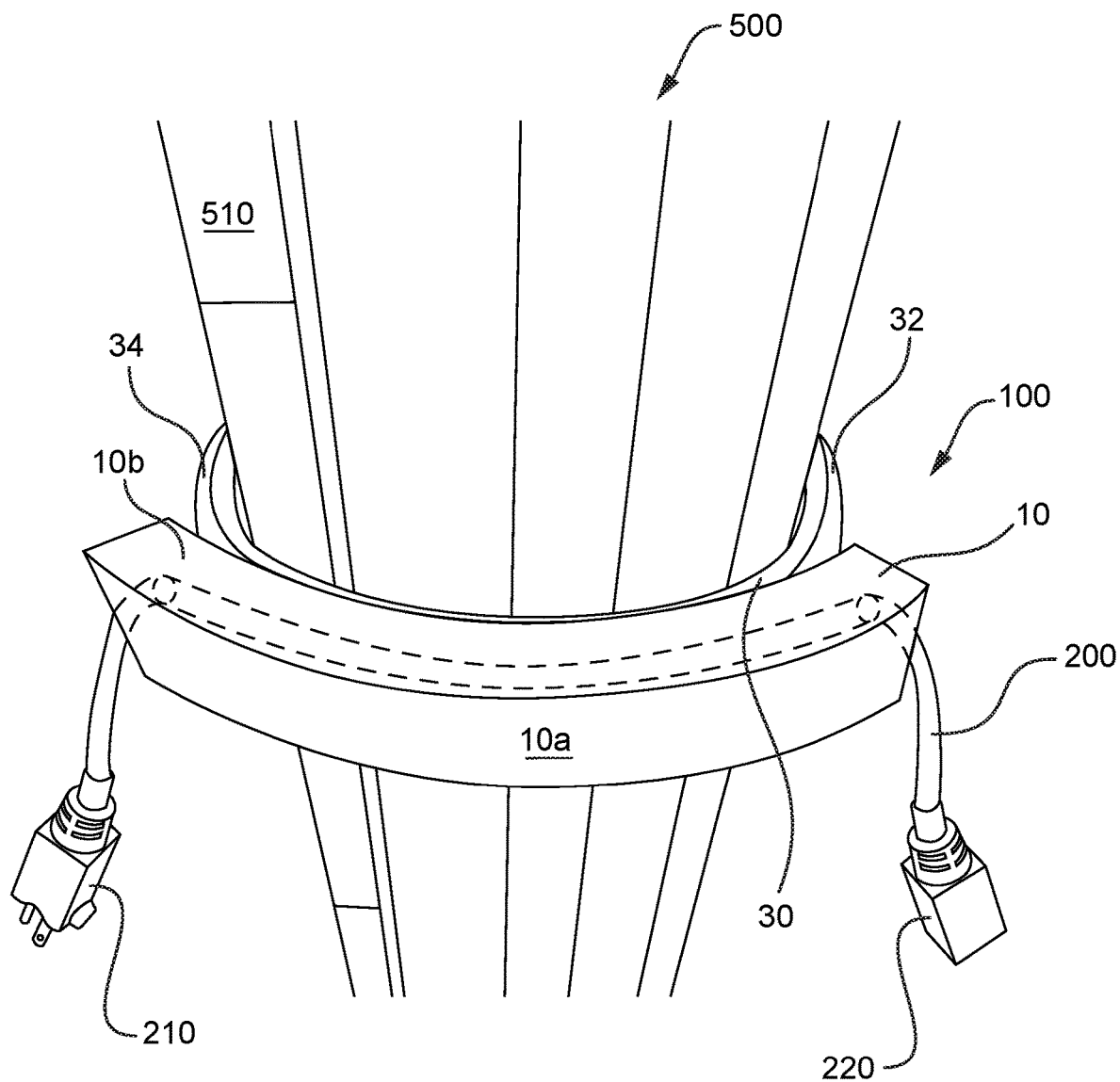
FIG. 2 is a front perspective view of a cord protector according to the instant disclosure detachably secured attached to a doorframe.
Figure 3:
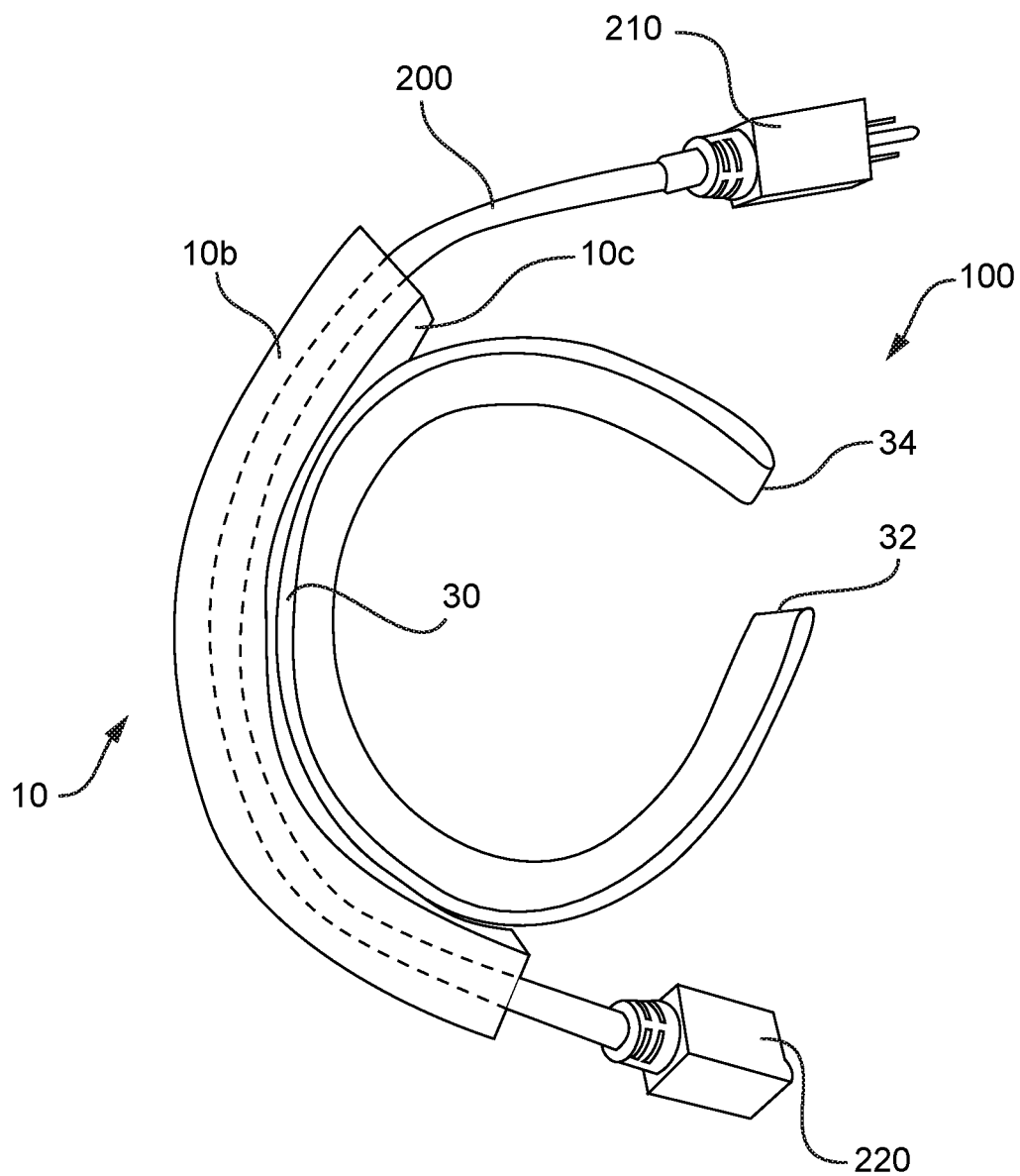
FIG. 3 is a top plan view of a cord protector according to the instant disclosure.

At the outset, it should be appreciated that like drawing numbers on different drawing views identify identical, or functionally similar, structural elements. It is to be understood that the claims are not limited to the specifically disclosed and illustrated aspects.

Furthermore, it is understood that this disclosure is not limited to the particular methodologies, materials and modifications described and as such may, of course, vary. It is also understood that the terminology used herein is for the purpose of describing particular aspects only and is not intended to limit the scope of the disclosure or claims.

Unless defined otherwise, all technical and scientific terms used herein have the same meaning as commonly understood to one of ordinary skill in the art to which this disclosure belongs. Although any methods, devices or materials similar or equivalent to those described herein can be used in the practice the example aspects.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "substantially" and "generally" are synonymous with terms such as "nearly," "very nearly," "about," "approximately," "around," "bordering on," "close to," "essentially," "in the neighborhood of" "in the vicinity of" etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

While the following terms are not to be specifically limited, "non-rotatably connected" elements, is intended to refer to that the elements are connected so that whenever one of the elements rotate, all the elements rotate; and relative rotation between the elements is not possible. Radial and/or axial movement of non-rotatably connected elements with respect to each other is possible, but not required. Additionally, "plastic deformation" is intended to refer to, for example, instances wherein when a sufficient load is applied to a material to form it into a desired shape and such force released, the material is formed into the desired shape and the desired shape maintained until a further sufficient force may be applied so as to reform the material. In other words, a material subject to plastic deformation may be subject to a sufficient force so to bend or form such material to maintain a first shape, and then may be subject to a subsequent sufficient force to bend or reform such material to return it so as to maintain its original shape, or to maintain a further shape. "Elastic deformation" is intended to refer to instances wherein when a sufficient load is applied to a material such material undergoes a temporary shape change while subject to such force but is restored to its original shape upon release of such force. "Resilient" can refer to the ability of a material to return to its original form and/or have force absorbing/rebounding qualities. Hence, a material can be resilient in the sense that upon application of a force it rebounds entirely to return to its original form, e.g., some rubbers, non-resilient in that it has no rebound and does not return to its original form, e.g., some hard plastics and metals, or semi-resilient in that it only partially rebounds and only partially returns to its original form, e.g., some plastics, rubbers and foams, etc.

Also, the descriptors "outer", "inner", "upper", "lower", "top", "bottom", "right", "left", and their derivatives in the description herebelow refer to the perspective of one facing the inventive subject matter as shown in, for example, FIG. 1. Additionally, it should be understood that the use of such descriptors is for orientation purposes in order to describe the inventive subject matter and, unless otherwise specified, is not intended to specifically define one or more sides, or surfaces, as such.

It should be appreciated that while the instant disclosure primarily describes a "cord protector" used in association with an electrical cord, e.g., an electrical extension cord, the cord protector is not intended to be limited to receiving an electrical cord, but rather can be configured to receive a hose, a tube, or a line, or combinations thereof, e.g., an electrical cord and a pneumatic hose.

Adverting now to the figures, which depicts cord protector 100 detachably secured to door frame 500 via wall/surface(s) 510 by means of the inherent bias provided by clamping/gripping mechanism 30. As may be appreciated from the figures, cord protector generally comprises main body 10, first arm 32, and second arm 34.

Main Body

Figure 11:
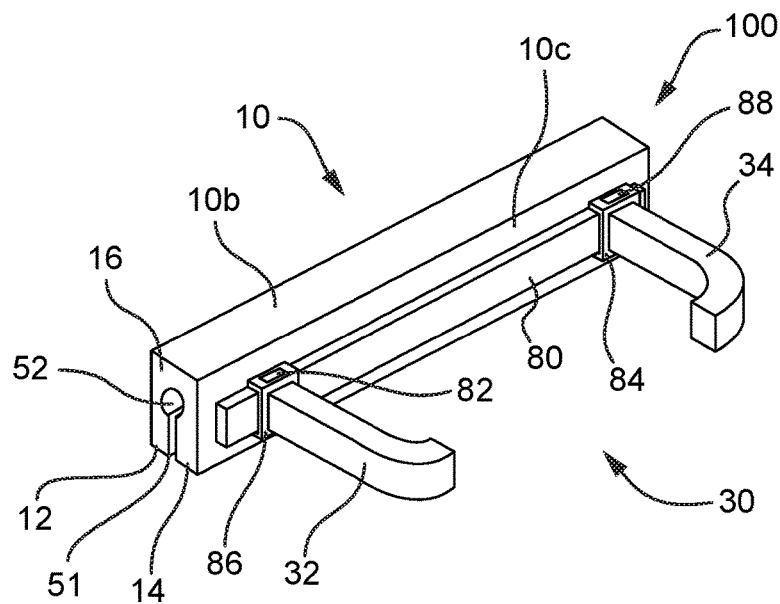
FIG. 11 is a front perspective view of a cord protector according to the instant disclosure including an adjustable clamping mechanism; and, FIGS. 12 and 13 are partial front perspective views of a cord protector according to the instant disclosure showing a terminal end of a first arm including a bendable/reformable end, and a terminal end of a second arm including an additional frictional surface in the form of a rubber pad suction cup.

Main body 10 is generally configured to comprise a longitudinal length capable of spanning the width/depth of door frame 500, or a window frame and in some aspects is formed from a resilient or semi-resilient material such as rubber, plastics, foams, and/or combinations thereof. Ion some aspects, the main body can also include a protective sheath of which can be woven and comprise one or more of a fabric, rubber of plastic, or metal, which allow the main body to be adjusted, bend, or expand/contract. In some aspects, the longitudinal length of main body 10 is such that its terminal ends extend beyond door frame 500 or a window frame and/or wrap about door frame 500 or window frame. In some aspects, the terminal ends of main body 10 are such that they are configured to overlap wall surface(s) 510 on each side of a wall or window frame—this configuration can assist in preventing cord protector 100 from being inadvertently dislodged from a door or window frame upon application of a force such as the closure of a door or window. In sum, by allowing the terminal ends of main body to extend past the door or window frame, a door or window is more apt to close upon and pinch the terminal ends between a door and a door frame, for example, rather than dislodge the cord protector from its secured position. As shown in the attached figures, while main body 10 is illustrated as generally having a fixed longitudinal length extending past the width/depth of door frame 500, as shown in FIG. 11, the main body 10 can be configured to include an adjustable assembly that allows the first arm 32 and the second arm 34 to be slidably adjusted relative to one another so as to allow the cord protector to be adjusted as may be needed in order fit walls/surfaces that may be wide or narrow. More specifically, as shown in FIG. 11, for example, main body 10 can be configured to include rail assembly 80 capable of slidably receiving slidable attachment 82 that slidably secures first arm 32 and slidable attachment 84 that slidably secures second arm 34. As may be appreciated, slidable attachments 82 and 84 can include securing/releasing mechanisms 86 and 88, which are configured for unlocking the slidable attachments so as to allow the first arm and the second arm to be slidably adjusted relative to one another along rail 80, and then locked to maintain the desired position of the first arm relative and the second arm. Securing/releasing mechanisms 82 and 84 may comprise suitable means for allowing the first arm and the second arms to be unlocked, slidably adjusted and then locked in a suitable position. Such suitable means can include, but are not limited to pin/detent assemblies, ratcheting-type assemblies, threaded/worm-type assemblies, lever and vise-type assemblies, etc. In addition to the above, main body 10 can be configured to be adjustable by, for example, having an accordion-like structure, which allows the main body to be adjustable expanded and contracted to fit a specific application, and also allow a single cord protector 100 to satisfy several different applications.

Figure 4B:
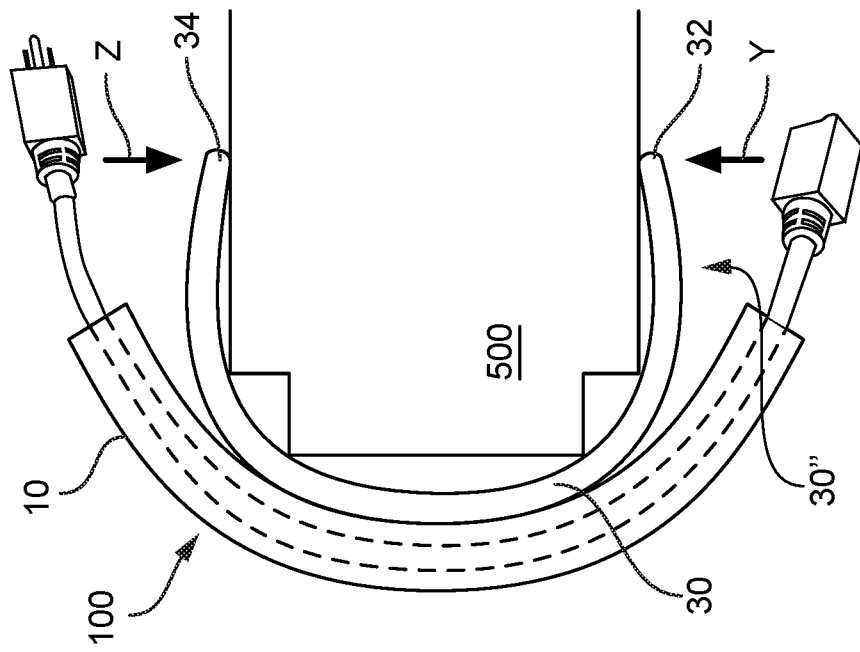
FIGS. 4A and 4B are top plan views of a cord protector according to the instant disclosure wherein the clamping gripping mechanism is disposed in respective closed/resting and open/active positions.
Figure 4A:
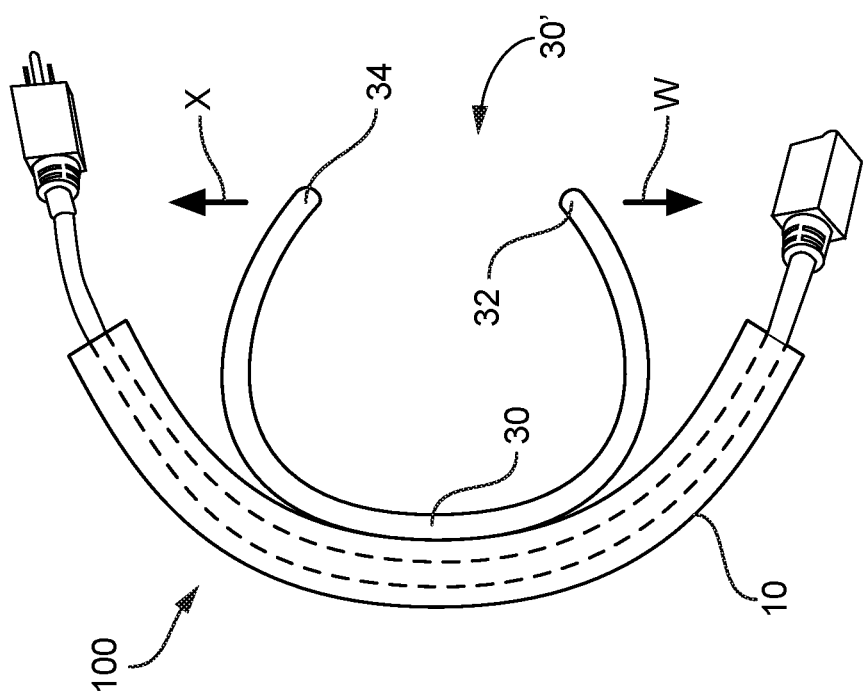
Figure 5A:
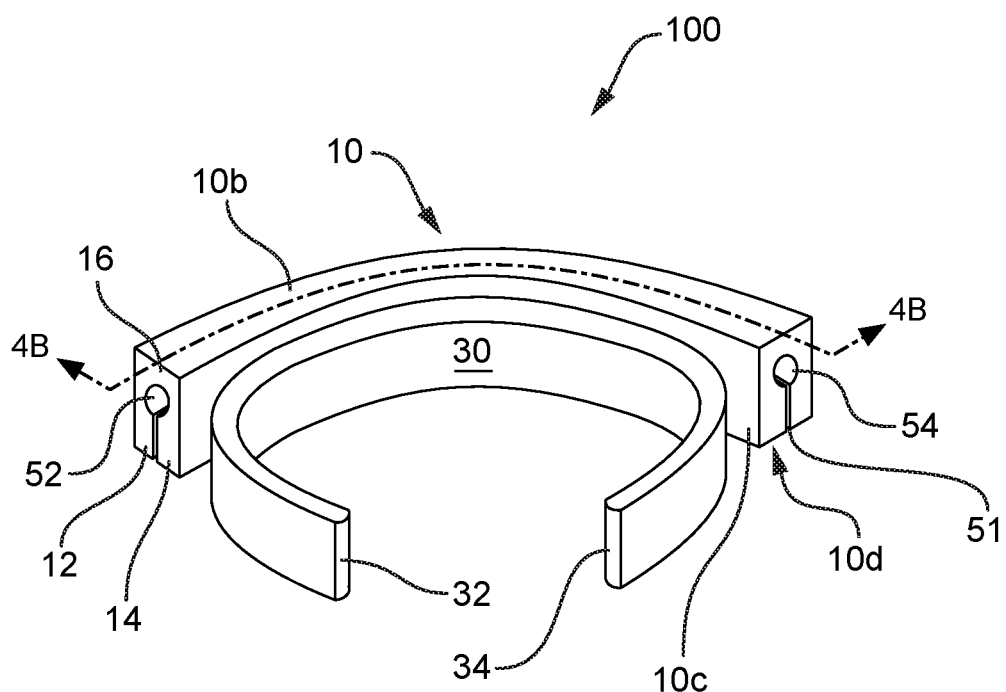
FIG. 5A is a rear perspective view of a cord protector according to the instant disclosure without an extension cord inserted in the main body.
Figure 5B:
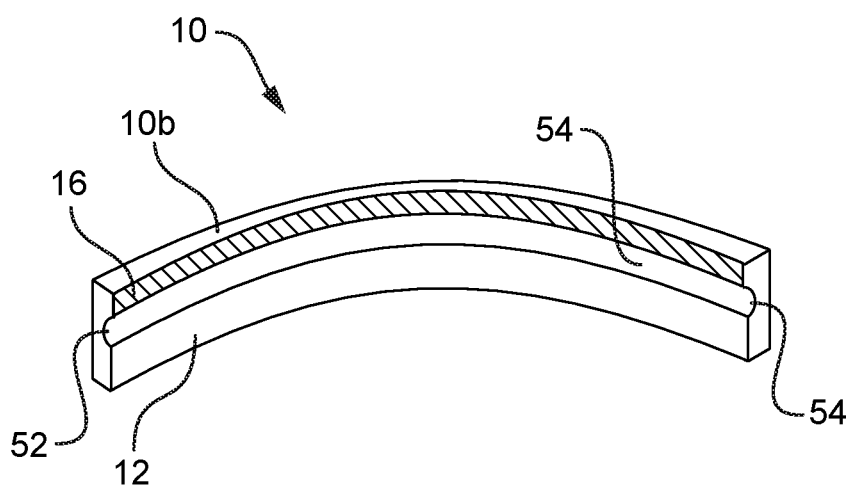
FIG. 5B is a rear perspective sectional view of a cord protector according to the instant disclosure taken generally along line 5B-5B of FIG. 5A.
Figure 6:
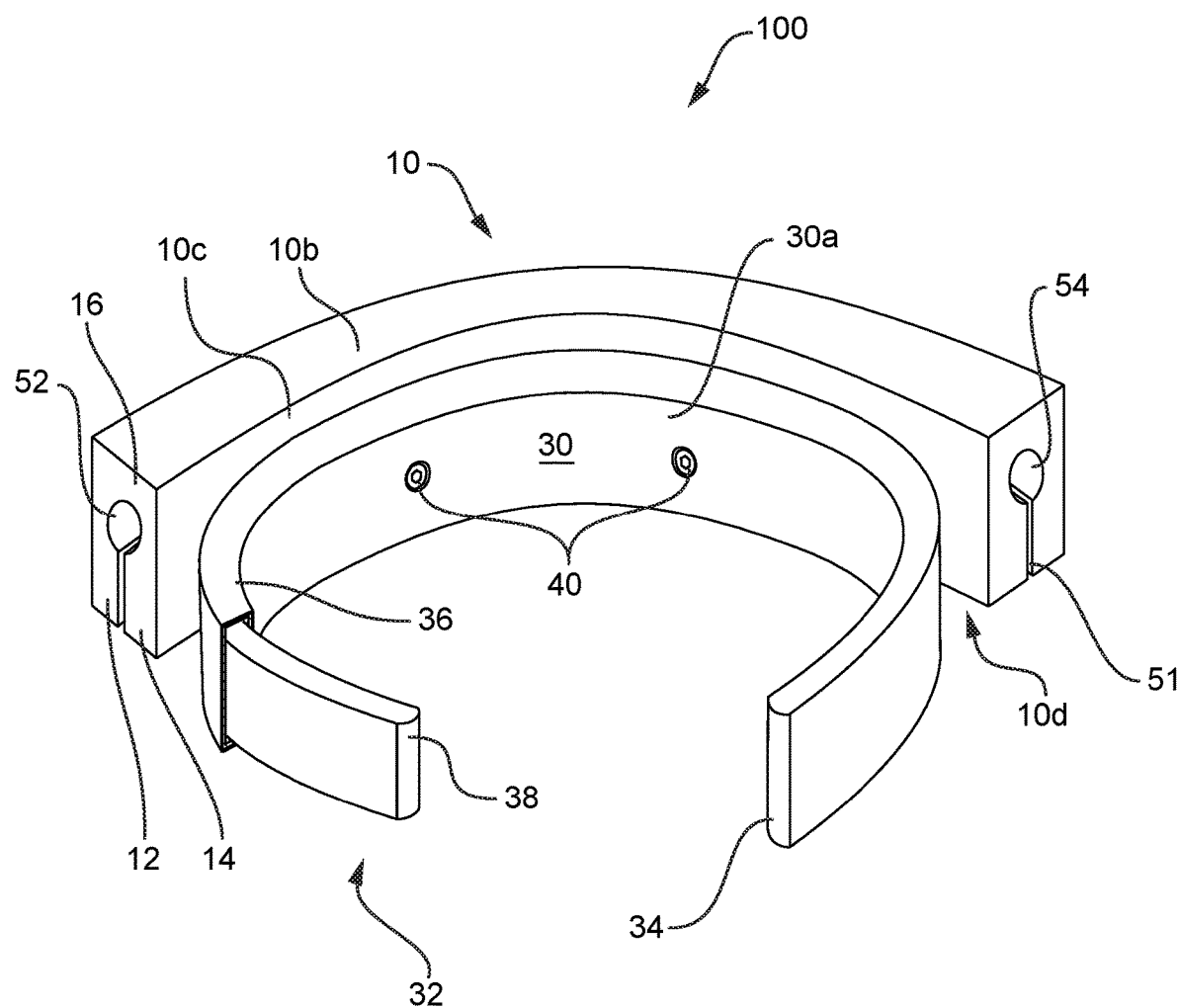
FIG. 6 is a rear perspective view of a cord protector according to the instant disclosure without an extension cord inserted in the main body and showing a portion of the outer cover of the clamping/gripping mechanism removed.
Figure 7:
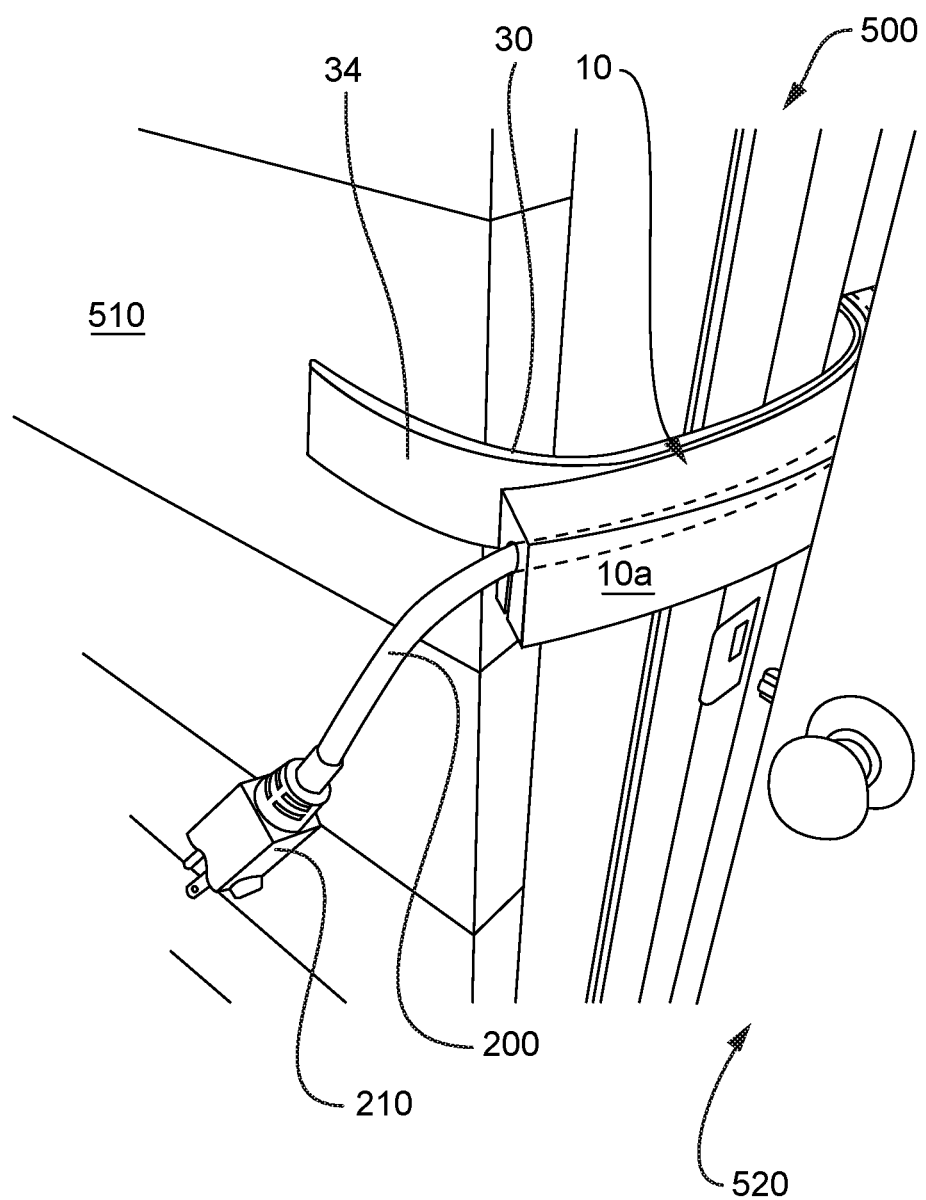
FIG. 7 is a right-side view of a cord protector according to the instant disclosure detachably secured to a doorframe at a height and showing that the cord disposed therein is protected from damage from as a result of the door being closed upon the main body.

As shown more clearly in FIGS. 1-5B, main body 10 generally includes outer surface 10a, inner surface 10c, upper surface 10b and lower surface 10d, as well as outer separated portion 12, inner separated portion 14, bridge portion 16, channel 50, and groove 51. As may be appreciated, outer surface 10a, inner surface 10c, upper surface 10b and lower surface 10d generally define the exterior surface of main body 10, which is shown in the figures in the form of a rectangularly-shaped structure. Other shaped structures are contemplated and the exterior surfaces of the main body can be configured, for example, to form a cylindrically shaped structure. As shown in FIGS. 5A and 5B, outer separated portion 12 and inner separated portion 14 are partially separated from one another by channel 50 and groove/slit 51 but remain connected to one another via bridge portion 16. In the figures, channel 50, and groove/slit 51 in communication therewith, is shown as extending along the length of main body 10 from first channel opening 52 to second channel 54 opening, but such is not necessarily required and the channel and groove may extend only along a portion of the main body, i.e., first and channel second openings 52 and 54 may be disposed proximate the terminal ends of the main body, but not necessarily at the terminal ends of the main body.

Outer separated portion 12, inner separated portion 14, bridge portion 16, channel 50, and groove 51 are provided for allowing an access point and void into which a length of a cord, hose, tube or line may be inserted and then safely retained for purposes of protecting such cord, hose or line from damage. Accordingly, as shown in FIGS. 1-5A, outer separated portion 12, inner separated portion 14, and bridge portion 16 are configured to generally maintain a closed configuration at rest such that the outer separated portion 12 and inner separated portion 14 corresponding to groove/slit 51 contact one another to retain a cord, hose, tube, or line within channel 50. Bridge portion 16 is generally provided for connecting the outer separated portion 12 and inner separated portion 14 of main body to one another, but also serves as a hinge mechanism to allow the outer separated portion 12 and inner separated portion 14 to be separated along groove/slit 51 in order to insert a cord, hose, tube, or line into channel 50. As may be appreciated, because the main body can be fabricated from a resilient or semi-resilient material such as rubber, plastic, foam, etc. and/or combinations thereof, upon applying a force to open groove/slit 51 in order to insert a cord, hose, tube, or line into channel 50, the release of such force causes main body 10 to return to its original resting shape so as to secure and retain the cord, hose, tube, or line within channel 50.

Clamping/Gripping Mechanism

Clamping/Gripping Mechanism 30 is generally configured for detachably securing main body 10, to which it is fastened, to a surface or structure such as door frame 500, or a window frame. In some aspects, clamping gripping mechanism 30 is formed from a metal band having a first arm 32, a second arm 34, a central portion disposed between first arm and second arm, and an outer sheath 36, which can extend along one or more lengths thereof and be formed of a rubber, plastic woven fabric so as to prevent or minimize damage to a surface to which the cord protector is detachably secured, e.g., door frame 500. As may be appreciated from the figures, main body 10 can be fastened to the central region of the clamping/gripping mechanism 30 by means of appropriate fasteners 40, e.g., nuts and bolts, rivets, screws, etc. and can be of a fixed longitudinal length between the terminal ends of first arm 32 and second arm 34 of sufficient length such that its terminal ends extend beyond door frame 500 or a window frame and/or wrap about door frame 500 or window frame. In some aspects, the terminal ends of clamping/gripping mechanism 30 are such that they are configured to overlap wall surface(s) 510 on each side of a wall or window frame—this configuration can assist in preventing cord protector 100 from being inadvertently dislodged from a door or window frame upon application of a force such as the closure of a door or window. In sum, by allowing the terminal ends of the clamping/gripping mechanism 30 to extend past the door or window frame sop as to grip wall surface 510, a door or window is more apt to close upon and pinch the terminal ends between the door and a door frame, for example, rather than dislodge the cord protector from its secured position. As shown in the attached figures, while clamping/gripping mechanism 30 is illustrated as generally having a fixed longitudinal length extending past the width/depth of door frame 500, as shown in FIG. 11, the main body 10 can be configured to include an adjustable assembly that allows the first arm 32 and the second arm 34 to be slidably adjusted relative to one another so as to allow the cord protector to be adjusted as may be needed in order fit walls/surfaces that may be wide or narrow. More specifically, as shown in FIG. 11, for example, main body 10 can be configured to include rail assembly 80 capable of slidably receiving slidable attachment 82 that slidably secures first arm 32 and slidable attachment 84 that slidably secures second arm 34. As may be appreciated, slidable attachments 82 and 84 can include securing/releasing mechanisms 86 and 88, which are configured for unlocking the slidable attachments so as to allow the first arm and the second arm to be slidably adjusted relative to one another along rail 80, and then locked to maintain the desired position of the first arm relative and the second arm. Securing/releasing mechanisms 82 and 84 may comprise suitable means for allowing the first arm and the second arms to be unlocked, slidably adjusted and then locked in a suitable position. Such suitable means can include, but are not limited to pin/detent assemblies, ratcheting-type assemblies, threaded/worm-type assemblies, lever and vise-type assemblies, etc. Additionally, the clamping/gripping mechanism can be configured to be adjustable by, for example, having portions of the first arm 32 and the second arm 34 slidably received by the other, which allows the clamping/gripping mechanism to be adjustable expanded or contracted to fit the specific application, and also allow a single cord protector 100 to satisfy several different applications.

Figure 12:
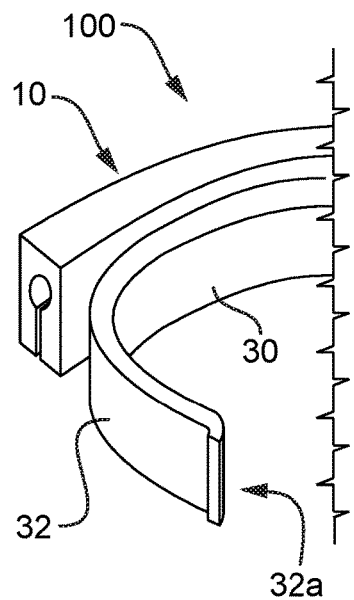
Figure 13:
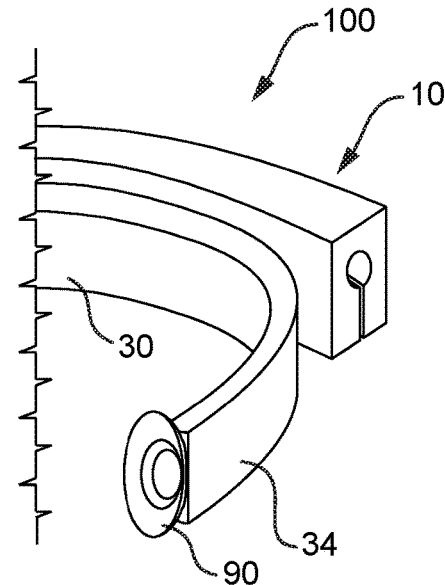

As may be appreciated from the figures, clamping/gripping mechanism 30 generally comprises a banded structure that forms a C-shape, of which portions thereof are capable of exhibiting elastic deformation. That is, as shown in FIGS. 4A and 4B, first arm 32 and second arm 34 are configured to maintain a resting/closed position 30' having the C-shape as shown in FIG. 4A. However, when sufficient forces are applied upon the first arm 32 and the second arm 34 in the direction of arrows X and W in FIG. 4A, the clamping/gripping mechanism may be placed the open/active position 30" for purposes of detachably securing the cord protector to a door or window frame or other surface. As shown in FIG. 4B, when the first arm 32 and the second arm 34 of the clamping/gripping mechanism 30 are opened and each secured about door frame 500, when the applied force is then released, the first arm 32 and second arm 34 attempt to return to the resting/closed position 30' of FIG. 4A, but rather assert forces Y and Z against wall surface 510, which serves to secure the cord protector to wall 510. As shown in FIG. 13, regions proximate the inner surfaces of the terminal ends of first arm 32 and second arm 34 can be configured to include friction surfaces 90, e.g., rubber pads, suction cups, etc., that can provide additional friction tending to increase the ability of the clamping/gripping mechanism 30 to remain secured to a surface. In addition to the above, while the clamping gripping mechanism 30 can comprise inner core 38 formed from a metal band having first arm 32, second arm 34, and a central portion disposed between the first arm and the second arm, and has been described as being elastically deformable such that the clamping/gripping mechanism returns to its original shape upon the release of an applied force, as shown in FIG. 12 portions of the first arm 32 and the second arm 34 proximate the terminal ends thereof can be configured to comprise one or more plastically deformable portions 32a that allow such portions to be bent and formed and/or reformed to a desired shape. In such cases, such portions 32a, owing to their plastic deformative ability, can then maintain such bent/reformed shape so as to, for example, be formed into a shape that is complementary to a surface to which the clamping/gripping mechanism may be secured. The above can be provided, for example, via an inner core 38 of metal having a thickness that is greater proximate the central portion of the clamping/gripping mechanism, and thinner proximate the terminal ends of the first arm and the second arm, which allow such terminal portions to be formed and reformed into a desired shape.

In accordance with the above, a cord, such as electrical extension cord 200 having male and female connectors 210 and 220, respectively, or a hose, tube or line can be secured within cord protector 100 and secured about door frame 500 and to wall surface 510 by opening the clamping/gripping mechanism 30, placing the clamping/gripping mechanism about the door frame, and releasing the first arm 32 and second arm 34 to allow them to assert a force upon wall surface(s) 510.

Alternative/Additional Configurations

Referring now to FIGS. 8A-10, the above-described cord protector 100 can be configured in one or more alternate manners without departing from the spirit and scope of the inventive subject matter. For example, as shown in FIGS. 8A-8B, a cord protector in accordance with the instant disclosure can be configured similar to the previously described cord protector 100, but instead comprise a plurality of channels for passing multiple cords, hoses, tubes, lines, or combinations thereof therethrough. Similarly, as shown in FIG. 9, a cord protector in accordance with the instant disclosure can be configured to comprise inner and outer separated portions wholly separate from one another but connected to one another via a separate and distinct hinge, which allow the inner and outer separated portions to be opened and closed via the hinge. While not shown, a cord protector including a separate and distinct hinge can also include a tab/locking mechanism (not shown) for ensuring that the inner and outer separated portions can remain closed and secured relative to one another once a cord, hose, tube or line has been secured therein. Also, as shown in FIG. 10, cord protector 70 in accordance with the instant disclosure can be configured to comprise a cord, hose, tube or line that is integral with the main body 10. As shown by way of example in FIG. 10, the electrical cord main body 10 can be configured to include male and female connectors 74, 72, respectively, integrally formed into the main body at respective terminal ends thereof the main body, with the electrical cord disposed therebetween within a channel of the main body. Finally, while the clamping/gripping mechanism 30 has been described and illustrated herein as comprising fixed or adjustable metal band having a first arm 32, a second arm 34, a central portion disposed between first arm 32 and second arm 34, which allows the cord protector to be secured to a surface using the bias asserted by the first arm and the second arm, the clamping/gripping mechanism could comprise an alternative clamping/gripping mechanism such as an adjustable vise clamp allowing the gripping arms to be manually opened and closed via a lever or like structure.

Thus, it is seen that the objects of the invention are efficiently obtained, although modifications and changes to the invention may be readily imagined by those having ordinary skill in the art, and these changes and modifications are intended to be within the scope of the claims.

REFERENCE NUMBERS

10 Main Body
10a Outer Surface
10b Upper Surface
10c Inner Surface
10d Lower Surface
12 Outer Separated Portion
14 Inner Separated Portion
16 Bridge Portion
30 Clamping/Gripping Mechanism
30' Resting Closed Position
30" Active Open Position
32 First Arm
32a Bendable/Reformable Portion
34 Second Arm
36 Outer Sheath
38 Inner Core
40 Fastening Assembly
50 Channel
51 Groove/Slit
52 First Channel Opening
54 Second Channel Opening
60 Hinge
70 Main Body w/Integrated Cord and Connectors
72 Female Connector (Receptacle)
74 Male Connector (Plug)
80 Rail
82 Slidable Attachment
84 Slidable Attachment
86 Securing/Releasing Mechanism
88 Securing/Releasing Mechanism
90 Friction Surface
100 Cord Protector
200 Cord
210 Male Connector
220 Female Connector
500 Door frame
510 Wall
520 Door
W Direction
X Direction
Y Direction
Z Direction

What is claimed is:

1. A cord protector detachably securable to an object, comprising:

a main body, the main body having at least one channel disposed therein, the at least one channel extending along a portion of a longitudinal length of the main body, the at least one channel capable of receiving and securing a cord, line, or tube therein;

a clamping/gripping mechanism comprising a pair of oppositely disposed clamping/gripping arms that extend from opposite sides of the main body, the clamping/gripping arms are biased toward one another such that the clamping/gripping arms maintain a substantially closed position at rest;

wherein, the cord protector is capable of being detachably secured to the object by opening the clamping/gripping arms and allowing the clamping/gripping arms to close and clamp upon the object;

wherein at least one of the clamping/gripping arms include an outer sheath portion and an inner core portion;

wherein the outer sheath comprises a resilient composition and the inner core portion includes an elastically deformable portion and a plastically deformable portion, the elastically deformable portion being disposed the at a central region of the clamping/gripping mechanism and the plastically deformable portion being disposed proximate the terminal end regions of each of the clamping/gripping arms; and wherein the inner core portion comprises a metal.

2. The cord protector of claim 1, wherein a cord, line or tube is secured within the at least one channel, and the cord, line or tube includes at least one female connector end, at least one male connector end, or a combination of a female connector end and a male connector end.

3. A cord protector detachably securable to an object, comprising:

a main body, the main body having at least one channel disposed therein, the at least one channel extending along a portion of a longitudinal length of the main body, the at least one channel capable of receiving and securing a cord, line, or tube therein;

a clamping/gripping mechanism comprising a pair of oppositely disposed clamping/gripping arms that extend from opposite sides of the main body, the clamping/gripping arms are biased toward one another such that the clamping/gripping arms maintain a substantially closed position at rest;

wherein, the cord protector is capable of being detachably secured to the object by opening the clamping/gripping arms and allowing the clamping/gripping arms to close and clamp upon the object;

wherein, the main body includes an outer separated portion, an inner separated portion, and a bridge portion, the outer separated portion and the inner separated portion connected to one another via a bridge portion and separated from one another by a groove portion connected to the at least one channel.

4. The cord protector of claim 3, wherein the at least one channel extends along the longitudinal length of the main body.

5. The cord protector of claim 3, wherein the main body includes a plurality of channels extending along a portion of a longitudinal length of the main body, each of the plurality of channels capable of receiving and securing a cord, line, or tube therein.

6. The cord protector of claim 3, wherein the clamping/gripping arms are elastically deformable such that they are capable of being opened relative to one another against their bias to maintain an active state, and closed relative to one another to return to their original resting position.

7. The cord protector of claim 3, wherein at least one of the clamping/gripping arms include a portion thereof that is plastically deformable such that the portion may be formed and repositioned.

8. The cord protector of claim 3, wherein the main body comprises a resilient composition.

9. The cord protector of claim 3, wherein at least one of the clamping/gripping arms include an outer sheath portion and an inner core portion.

10. The cord protector of claim 9, wherein the outer sheath comprises a resilient composition and the inner core portion comprises a metal having an elastically deformable portion and a plastically deformable portion, the elastically deformable portion being disposed the at a central region of the clamping/gripping mechanism and the plastically deformable portion being disposed proximate the terminal end regions of each of the clamping/gripping arms.

11. The cord protector of claim 3, wherein a cord, line or tube is secured within the at least one channel, and the cord, line or tube includes at least one female connector end, at least one male connector end, or a combination of a female connector end and a male connector end.

12. A cord protector detachably securable to an object, comprising:

a main body, the main body having at least one channel disposed therein, the at least one channel extending along a portion of a longitudinal length of the main body, the at least one channel capable of receiving and securing a cord, line, or tube therein;

a clamping/gripping mechanism comprising a pair of oppositely disposed clamping/gripping arms that extend from opposite sides of the main body, the clamping/gripping arms biased toward each other such that the clamping/gripping arms maintain a substantially closed position at rest;

wherein, the cord protector is capable of being detachably secured to the object by opening the clamping/gripping arms and allowing the clamping/gripping arms to close upon the object;

wherein the main body comprises an outer separated portion, an inner separated portion, and a hinge, the hinge connecting the outer separated portion and the inner separated portion to one another such that the outer separated portion and the inner separated portion are openable and closeable relative to one another; and, wherein the cord, line, or tube is capable of being secured within the at least one channel by opening the outer and inner separated portions relative to one another, securing the cord, line, or tube therein, and closing the outer and inner separated portions upon one another.

13. The cord protector of claim 12, wherein the main body includes a plurality of channels extending along a portion of a longitudinal length of the main body, each of the plurality of channels capable of receiving and securing a cord, line, or tube therein.

14. The cord protector of claim 12, wherein the clamping/gripping arms are elastically deformable such that they are capable of being opened relative to one another against their bias to maintain an active state, and closed relative to one another to return to their original resting position.

15. The cord protector of claim 12, wherein at least one of the clamping/gripping arms include a portion thereof that is plastically deformable such that the portion may be formed and repositioned;

wherein the main body comprises a resilient composition;

wherein at least one of the clamping/gripping arms include an outer sheath portion and an inner core portion; and wherein, the outer sheath comprises a resilient composition and the inner core portion comprises a metal having an elastically deformable portion and the plastically deformable portion, the elastically deformable portion being disposed the at a central region of the clamping/gripping mechanism and the plastically deformable portion being disposed proximate the terminal end regions of each of the clamping/gripping arms.

16. The cord protector of claim 12, wherein a cord, line or tube is secured within the at least one channel, and the cord, line or tube includes at least one female connector end, at least one male connector end, or a combination of a female connector end and a male connector end.

* * * * *